April 25, 1967     W. B. TYRRELL, JR     3,315,677
DISPOSABLE SHIELD HAVING TRANSFER TAPE ALONG SIDE EDGES
Filed Jan. 29, 1964
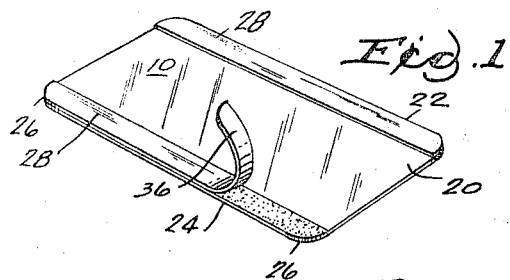
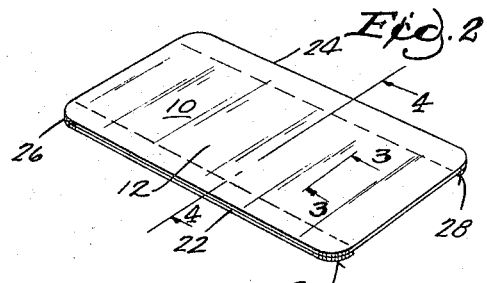
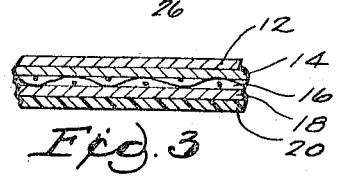
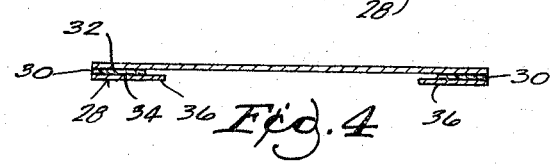
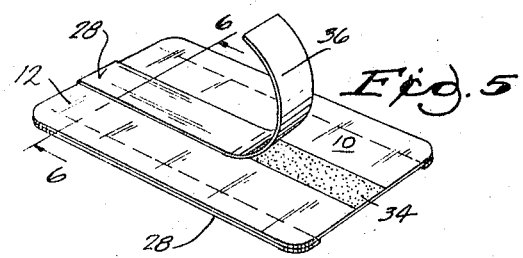
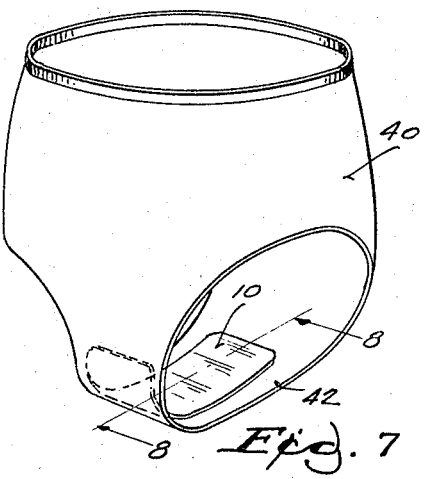
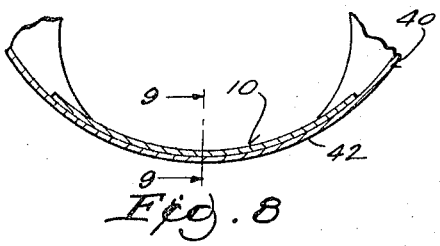
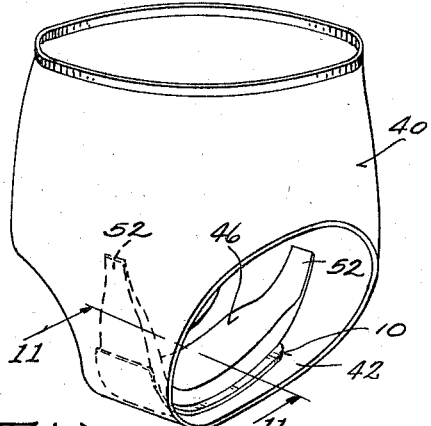
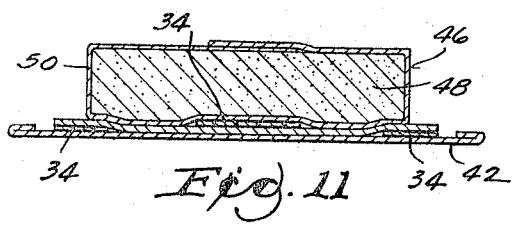
INVENTOR.
WALLACE B. TYRRELL, JR.
BY
Wheeler, Wheeler & Wheeler
ATTORNEYS

United States Patent Office 3,315,677
Patented Apr. 25, 1967

3,315,677
DISPOSABLE SHIELD HAVING TRANSFER
TAPE ALONG SIDE EDGES
Wallace B. Tyrrell, Jr., Venice, Fla., assignor to Tyrrell Industries, Inc., Venice, Fla., a corporation of Florida
Filed Jan. 29, 1964, Ser. No. 340,888
7 Claims. (Cl. 128—288)

This invention relates to a disposable shield particularly of a type intended to be worn in the crotch of an undergarment. The shield comprises a multi-ply sheet of absorbent tissue with an exposed water resistant or waterproof ply preferably made of polyethylene or the like. The shield preferably has a coarse meshed core usually including a nylon thread in at least one direction and a thread of rayon or cotton in the other direction. However, the invention is not essentially concerned with the material of which the sheet is made.

The invention contemplates that the sheet shall be elongated. It has been made in various forms. In its preferred form, it is rectangular with parallel sides and has strips of transfer tape applied along its longer margins to the waterproof ply of polyethylene or the like. The adhesive of the transfer tape is used to adhere the waterproof backing ply to the garment, leaving the soft absorbent ply exposed within the garment. Each such transfer tape includes, in the preferred embodiment of the invention, a strip of cellophane tape having both faces coated with pressure sensitive adhesive and to which is adhered at one side a protective strip of release-coated material which may, for example, have a coating of silicon. Thereby it is very lightly adherent so that it is readily stripped to expose the pressure sensitive adhesive, leaving all the adhesive on the tape. This adhesive is of a character such that it will readily adhere to a garment in which the shield is placed but can readily be removed therefrom, taking all of the adhesive with it, and leaving none in the crotch of the garment. While I have found some adhesives better than others, all that I have tested in the field of transfer tapes have been acceptable.

In one embodiment of the invention, the shield is intended primarily for the protection of the garment either during normal wear or during try-on in a store. In another embodiment of the invention, the shield may be equipped with another transfer tape along the center of its opposite side (the side on which absorbent tissue is exposed). In this position, the transfer tape last mentioned can have its release-coated covering strip removed to expose adhesive which will receive and position a sanitary napkin without requiring the use of the conventional belt.

In the drawing:
FIG. 1 is a view in perspective of a shield embodying the invention with a portion of the release strip partially withdrawn to expose the adhesive on the under surface of the shield preliminary to the inversion of the shield and the positioning thereof within the garment.

FIG. 2 is a view in perspective showing the shield in position for use.

FIG. 3 is an enlarged detail view taken in section on the line 3—3 of FIG. 2.

FIG. 4 is a detail view taken in section on the line 4—4 of FIG. 2.

FIG. 5 is a view similar to FIG. 2 showing a modified embodiment of the invention.

FIG. 6 is a view taken in section on the line 6—6 of FIG. 5.

FIG. 7 is a view taken in perspective showing a garment in which a shield embodying the invention has been applied for use.

FIG. 8 is a view taken in section on the line 8—8 of FIG. 7.

FIG. 9 is a view taken in section on the line 9—9 of FIG. 8.

FIG. 10 is a view similar to FIG. 7 showing the shield used in position in a sanitary napkin.

FIG. 11 is a view taken in transverse section on the line 11—11 of FIG. 10.

The composite sheet 10 shown in FIGS. 1 and 2 comprises a ply 12 of creped tissue or so-called wadding which is uppermost in the use of the shield. Beneath this is preferably laminated another ply 14 of tissue which is superimposed on a core 16 of coarse meshed gauze fabric. As above stated, this may have both warp and weft threads of nylon or the like but either thread may be of other material. For example, one thread may be of nylon and another one of rayon. Beneath this is preferably another ply 18 of tissue and a backing ply 20 which is of waterproof material such as polyethylene, many equivalent materials being available for this purpose.

As best shown in FIGS. 1 and 2, the shield 10 is preferably of generally rectangular form having elongated sides 22 and 24 and rounded corners 26. Along the longer sides 22 and 24 are disposed so-called transfer tapes 28 applied to the waterproof backing ply 20. Each transfer tape comprises a strip 30 of cellophane or the like which is coated on both faces with layers of pressure sensitive adhesive at 32 and 34 (see FIG. 4). The pressure sensitive adhesive 32 adheres to the waterproof ply 20 while the pressure sensitive adhesive 34 is covered by a release-coated protective strip 36 which may be pulled off by the user preliminary to the application of the shield to a garment (see FIG. 1).

For certain uses as hereinafter explained, I may also apply a longitudinal strip of transfer tape centrally of the tissue paper ply 12 on the surface of the shield 10 which is uppermost in use (FIGS. 5 and 6). The transfer tape may be identical in construction with that above described, although it has greater width for reasons explained below. Withdrawal of the protective strip 36 will expose the coating 34. In this instance, this coating is exposed only when it is desired that the shield be used for positioning a sanitary napkin within the garment in which the shield is worn.

Such a garment is shown at 40 in FIGS. 7, 8 and 9 and crotch 42 in which the shield 10 is shown. It is conventional in such garments that the crotch portion 42 shall be yieldable in a direction which is longitudinal with respect to the applied shield 10. Due to the fact that the pressure sensitive adhesive coating 34 which is exposed for application of the shield to the garment extends in a direction longitudinally of the shield, the disengagement of the shield due to this stretch of the crotch of the garment during wear will be only partial and momentary and as soon as the garment stretch reaches its maximum, the adhesive re-engages to hold the shield securely in position. It is important that the adhesive extend longitudinally, since adhesive applied transversely does not reliably re-engage without wrinkling of the shield.

A shield of the type herein disclosed can readily be manufactured from the intermediate product described in my companion application entitled Dress Shield and Method of Dress Shield Manufacture, now Patent No. 3,259,911. Such product comprises a web of absorbent and waterproof plies such as those shown at 12, 14, 16, 18 and 20 in FIG. 3 hereof, with longitudinally extending transfer tapes laterally spaced on and adherent to the waterproof ply 20 of the web.

The shields disclosed in the companion application aforesaid are preferably cut in rows in which the length of the shield extends transversely of the web, so that the cut portions of the transfer tape adhere to the top and bottom ends of such shield. The present procedure differs in that, in making the shields of the present invention, the shield is oriented to lie longitudinally of the web so that when laterally adjacent shields are severed from each other, each will have a longitudinal half portion of one of the original transfer tapes. This method of manufacture accounts for the fact that in FIG. 4 the outside margins of the strip 30 and the protective strip 36 are in marginal register, whereas the inside margin of protective strip 36 laps the inside margin of the adhesive coated strip 30. Similarly, in FIG. 6, half tapes are shown along the outside margin of the shield 10 whereas a full width tape is shown adherent to the absorbent ply 12 of the shield.

FIGS. 10 and 11 show the device when used to position the sanitary napkin 46 within the garment. The sanitary napkin conventionally includes a pad 48 and a wrapper 50. The projecting ends 52 of the gauze wrapper may be left free, as shown in FIG. 10, or may be folded over onto the rest of the sanitary napkin, or beneath it. This is a matter of choice to be determined by the user. In any case, the adhesive 34 exposed by the withdrawal of the release strip 36 on the upper side of the shield will engage itself with the wrapper 50 of the sanitary napkin in the manner clearly shown in FIG. 11, thereby holding the sanitary napkin securely in crotch 42 of the panty 40.

I claim:

1. A disposable shield intended to be worn in the crotch of an undergarment, said shield comprising an elongated assembly of an absorbent ply superimposed on a water resistant ply and having side and end margins, the water resistant ply having, adherent to the exposed surface which is lowermost in the use of the shield, strips of transfer tape extending longitudinally along its side margins.

2. A shield according to claim 1 which comprises a plurality of plies of absorbent tissue between certain of which there is a core of coarse mesh gauze, the shield having a generally rectangular over-all outline and the aforesaid strips of transfer tape including a plurality of laminations one of which is a strip having pressure sensitive adhesive coating on both faces and the other of which is a protective strip, the protective strip lapping the first mentioned strip toward the center of the shield and having is margin in registry with the margin of the first mentioned strip along the side margin of the shield.

3. A disposable shield intended to be worn in the crotch of an undergarment for use in positioning a sanitary napkin in a garment in which the shield is used, said shield comprising an elongated assembly of an absorbent ply superimposed on a water resistant ply and having side and end margins, the water resistant ply having adherent to the exposed surface which is lowermost in the use of the shield strips of transfer tape extending longitudinally along its side margins, said shield having a third transfer tape adherent to the exposed absorbent ply at the face of the shield which is uppermost in use, said transfer tape including one ply which is coated with adhesive on both faces and adheres to the said absorbent ply of the shield and another ply of protective, release-coated material which overlies the uppermost adhesive coating of the first mentioned strip and can be removed therefrom to expose adhesive for the positioning of the sanitary napkin.

4. A shield for the crotch of a garment and which also includes means for positioning a sanitary napkin, said shield having upper and lower faces and being provided on the face which is lowermost in use with a pressure-sensitive adhesive along each of its side margins and with protective and readily removable coverings therefor and is further provided on the face which is uppermost in use with pressure sensitive adhesive and a protective and readily removable covering therefor.

5. In combination, a garment having a crotch, and means for positioning solely from said garment a sanitary napkin for the wearer of the garment, said means being separately prefabricated to be independent of the garment and the sanitary napkin and comprising pressure sensitive adhesive means for engaging the garment and for engaging the sanitary napkin, and a protective covering for said adhesive means.

6. In combination, a garment having a crotch, a sanitary napkin, and an adhesive-carrier means independent of the garment and of the sanitary napkin and intervening between the napkin and the garment crotch and having first pressure sensitive adhesive means detachably engaged with the garment and second pressure adhesive means engaged with the sanitary napkin.

7. A disposable shield intended to be worn in the crotch of an undergarment, said shield comprising an elongated assembly of an absorbent ply superimposed on a water-resistant ply, strips of transfer tape engaged with the water-resistant ply at spaced points on the under surface of said shield, at least one other strip of transfer tape on the absorbent ply, each such strip having a pressure-sensitive coating and a protective strip of release-coated material covering such coating and removable therefrom.

References Cited by the Examiner

UNITED STATES PATENTS

| | | | |
|---|---|---|---|
| 2,030,135 | 3/1936 | Carpenter | 128—505 X |
| 2,428,881 | 10/1947 | Kispert | 128—288 |
| 2,660,173 | 11/1953 | Erteszek | 128—288 |
| 2,838,048 | 6/1958 | Kowalski | 128—290 |
| 3,044,467 | 7/1962 | Campan | 128—290 |

RICHARD A. GAUDET, *Primary Examiner.*

ROBERT E. MORGAN, *Examiner.*

L. W. TRAPP, *Assistant Examiner.*